(12) United States Patent
Graebeldinger

(10) Patent No.: US 7,637,719 B2
(45) Date of Patent: Dec. 29, 2009

(54) SEALING ARRANGEMENT

(75) Inventor: Wilhelm Graebeldinger, Munich (DE)

(73) Assignee: MTU Aero Engines GmbH, Munich (DE)

( * ) Notice: Subject to any disclaimer, the term of this patent is extended or adjusted under 35 U.S.C. 154(b) by 513 days.

(21) Appl. No.: 11/659,776

(22) PCT Filed: Aug. 3, 2005

(86) PCT No.: PCT/DE2005/001366

§ 371 (c)(1),
(2), (4) Date: Feb. 8, 2007

(87) PCT Pub. No.: WO2006/015577

PCT Pub. Date: Feb. 16, 2006

(65) Prior Publication Data

US 2007/0252336 A1 Nov. 1, 2007

(30) Foreign Application Priority Data

Aug. 11, 2004 (DE) .................... 10 2004 038 933

(51) Int. Cl.
*F11D 11/02* (2006.01)
*F16J 15/44* (2006.01)
(52) U.S. Cl. ............... 415/173.3; 415/174.2; 415/230; 277/355
(58) Field of Classification Search ............... 415/134, 415/173.3, 173.5, 174.1, 174.2, 174.5, 229, 415/230, 231; 277/355
See application file for complete search history.

(56) References Cited

U.S. PATENT DOCUMENTS

| 5,474,305 | A | 12/1995 | Flower | 277/53 |
| 6,168,162 | B1 | 1/2001 | Reluzco et al. | 277/355 |
| 6,612,581 | B2 * | 9/2003 | Bhate et al. | 277/355 |
| 6,932,347 | B2 | 8/2005 | Beichl et al. | 277/355 |
| 2002/0020968 | A1 | 2/2002 | Gail et al. | 277/355 |

FOREIGN PATENT DOCUMENTS

| DE | 195 27 605 | 2/1997 |
| DE | 101 22 732 | 11/2002 |

* cited by examiner

*Primary Examiner*—Edward Look
*Assistant Examiner*—Jesse Prager
(74) *Attorney, Agent, or Firm*—Davidson, Davidson & Kappel, LLC

(57) ABSTRACT

A sealing arrangement, especially for a flow engine, for non-hermetically sealing a gap (12) between a rotor (10) and a stator (11), which comprises a seal having a plurality of sealing elements that are fixed to a sealing element support, said sealing element support being at least partially disposed in a receptacle (16) which is defined by a supporting element (17) and a cover element (18) is disclosed. The sealing element support is configured as a ring that is interrupted once or several times. Free ends (19, 20) of the sealing element support overlap in the area of interruptions in the circumferential direction. The contours of the supporting element (17) and the cover element (18) are adapted to the contours of the sealing element support and the sealing elements (15). At least one end (19, 20) of every part of the sealing element support is associated with an antirotation device (21, 22).

17 Claims, 2 Drawing Sheets

SEALING ARRANGEMENT

The present invention relates to a sealing arrangement, in particular for a fluid flow machine, for non-hermetically sealing a gap between a rotor and a stator, comprising a seal which includes a plurality of sealing elements that are affixed to a sealing-element carrier, the sealing-element carrier being disposed at least in portions thereof in a receiving space which is defined by a supporting element and by a cover element. In addition, the present invention relates to a fluid flow machine, a gas turbine, as well as to a steam turbine.

BACKGROUND

In fluid flow machines, particularly in gas turbines, such as aircraft engines, there are a number of application cases which require sealing two parts which move relative to each other, namely a stator and a rotor of the fluid flow machine, from a gas flow streaming through the fluid flow machine. Gas turbines, in particular, have, inter alia, at least one compressor, as well as at least one turbine, the or each compressor, as well as the or each turbine having a rotor which rotates relative to a fixed stator. The stator is, in particular, a stationary housing having associated fixed guide vanes. The rotor of a turbine or of a compressor has associated rotor blades, which rotate together with the rotor relative to the fixed guide vanes, as well as relative to the stationary housing.

To optimize the efficiency of gas turbines, in particular, it is necessary, inter alia, to minimize leakage flows between the rotating rotor and the fixed stator of the compressor and turbine. This requires, in particular, sealing a gap between the radially inside ends of the fixed guide vanes and the rotating rotor. A sealing arrangement for sealing the gap between the radially inside ends of the fixed guide vanes and the rotating rotor is also described as an "inner air seal." Another gap to be sealed is located, for example, between the radially outside ends of the rotating rotor blades and the stationary housing. A sealing arrangement for sealing the gap between the radially outside ends of the rotating rotor blades and the housing is also described as an "outer air seal."

In addition, there are other gaps to seal between a rotating rotor and a fixed stator. Sealing arrangements between a rotor and a stator are also referred to as dynamic sealing arrangements.

From the related art, it is already known to design dynamic sealing arrangements as brush seals, in order to non-hermetically seal a gap between a rotor and a stator. Reference is made here to related-art brush seals, as described in German Patents DE 195 27 605 C2 or DE 101 22 732 C2. In the case of the above-mentioned brush seals known from the related art, the brush seal is made of a plurality of wire-type bristles which are wound around a bristle carrier, the bristle carrier being constituted of a core element and of a clamping ring. The unit made up of a bristle carrier and bristles, which forms the actual brush seal, is arranged in a receiving space defined by a support ring and a cover ring.

In the brush seals in accordance with German Patents DE 195 27 605 C2 and DE 101 22 732 C2, the bristle carrier, made up of the core element and of the clamping ring, is designed as a closed ring, which is fixedly or immovably positioned, in particular clamped in the receiving space. This design of the bristle carrier as a closed ring, as known from the related art, results in a substantially inelastic bristle carrier, so that it is only possible to partially compensate, on the one hand, for example, for eccentricities of or other mechanical variations in the gap to be sealed between the rotor and the stator and, on the other hand, for thermal variations, caused, for example, by different thermal expansion coefficients, in the gap to be sealed between the rotor and stator of known brush seals. In related-art brush seals, a dynamically changing gap to be sealed is compensated exclusively by deflection of the bristles, resulting, on the one hand, in the generation of considerable frictional heat, and, on the other hand, in substantial wear to the bristles of the brush seal. Accordingly, the brush seals known from the related art are only able to compensate less than adequately for variations in the gap to be sealed that occur during operation.

SUMMARY OF THE INVENTION

Against this background, it is an object of the present invention to devise a novel sealing arrangement. In accordance with the present invention, the sealing-element carrier is designed as a ring having one or more points of discontinuity, free ends of the sealing-element carrier circumferentially overlapping one another in the region of points of discontinuity, contours of the supporting element and of the cover element being adapted to the contours of the sealing-element carrier and of the sealing elements, and an antirotation device being associated with at least one end of each part of the sealing-element carrier.

In the preferred embodiment of the present invention in which the seal is designed as a brush seal, the sealing elements as bristles, and the sealing-element carrier as a bristle carrier, the sealing arrangement according to the present invention provides a self-adapting brush seal for sealing a gap between a rotor and a stator, that is capable of automatically compensating for variations in the gap to be sealed without being subject to increased wear. The bristle carrier is no longer designed as a closed ring, as in related-art methods, but rather as a discontinuous, helicoidal or open ring, whose free ends circumferentially overlap one another. In addition, the bristle carrier is freely movable in the receiving space, an antirotation device limiting the circumferential mobility. On the one hand, the bristle carrier designed as a helicoidal ring is able to be displaced eccentrically in the receiving space and, on the other hand, by increasing or decreasing its circumference, is able to adapt the inside diameter of the brush seal to an outside diameter of the rotor.

Accordingly, the sealing arrangement according to the present invention provides numerous advantages. A minimal leakage of the gap to be sealed may be ensured in all operating states by the automatic adaptation of the inside diameter of the brush seal. It is possible to automatically compensate both for eccentricities of the rotor or of the stator, as well as for gap variations inherent in the operation. This results in a significant broadening of the application spectrum for brush seals, and, at the same time, in a reduction in the wear thereto.

In accordance with one advantageous refinement of the present invention, the circumferentially mutually overlapping ends of the bristle carrier designed as a helicoidal ring are axially and radially offset, the ends of the bristle carrier being offset in such a way that a radially inside end of the bristle carrier rests against bristles which are affixed to the radially outside end of the bristle carrier.

BRIEF DESCRIPTION OF THE DRAWINGS

The present invention is described in greater detail in the following with reference to FIG. 1 through 3. An exemplary embodiment of the present invention is clarified in greater detail in the following with reference to the drawings, without being limited thereto. The figures show.

DETAILED DESCRIPTION

Figure 1:
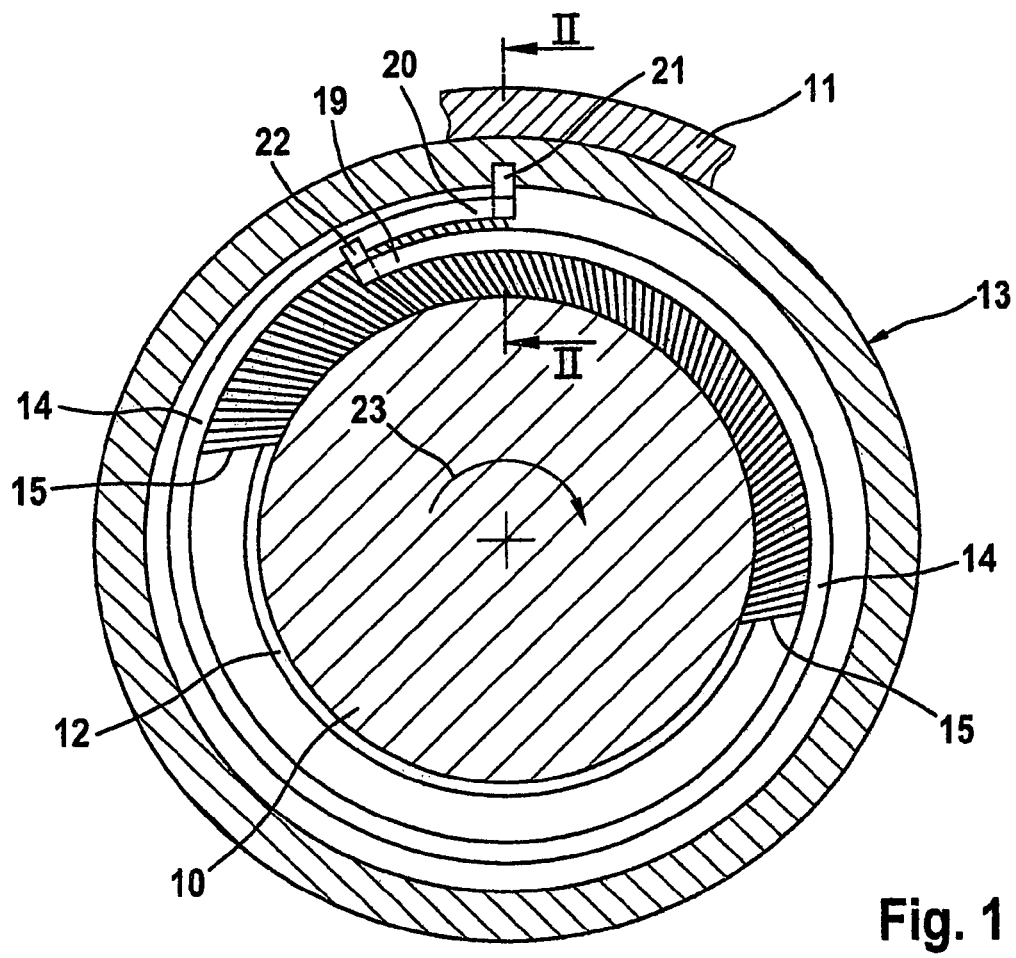
FIG. 1: a schematic cross section through a rotor and a stator, together with a sealing arrangement according to the present invention for non-hermetically sealing a gap between the rotor and the stator.
Figure 2:
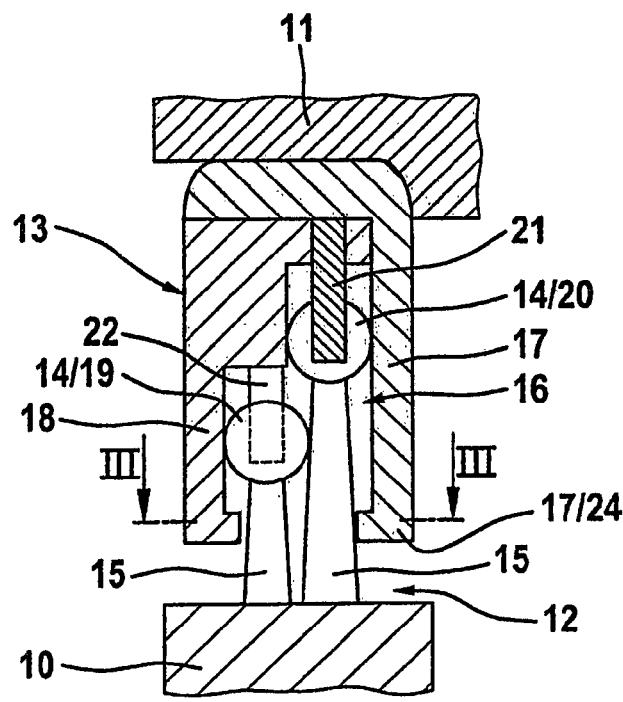
FIG. 2: a cross section through the sealing arrangement according to the present invention along the line of intersection II-II in accordance with FIG. 1.
Figure 3:
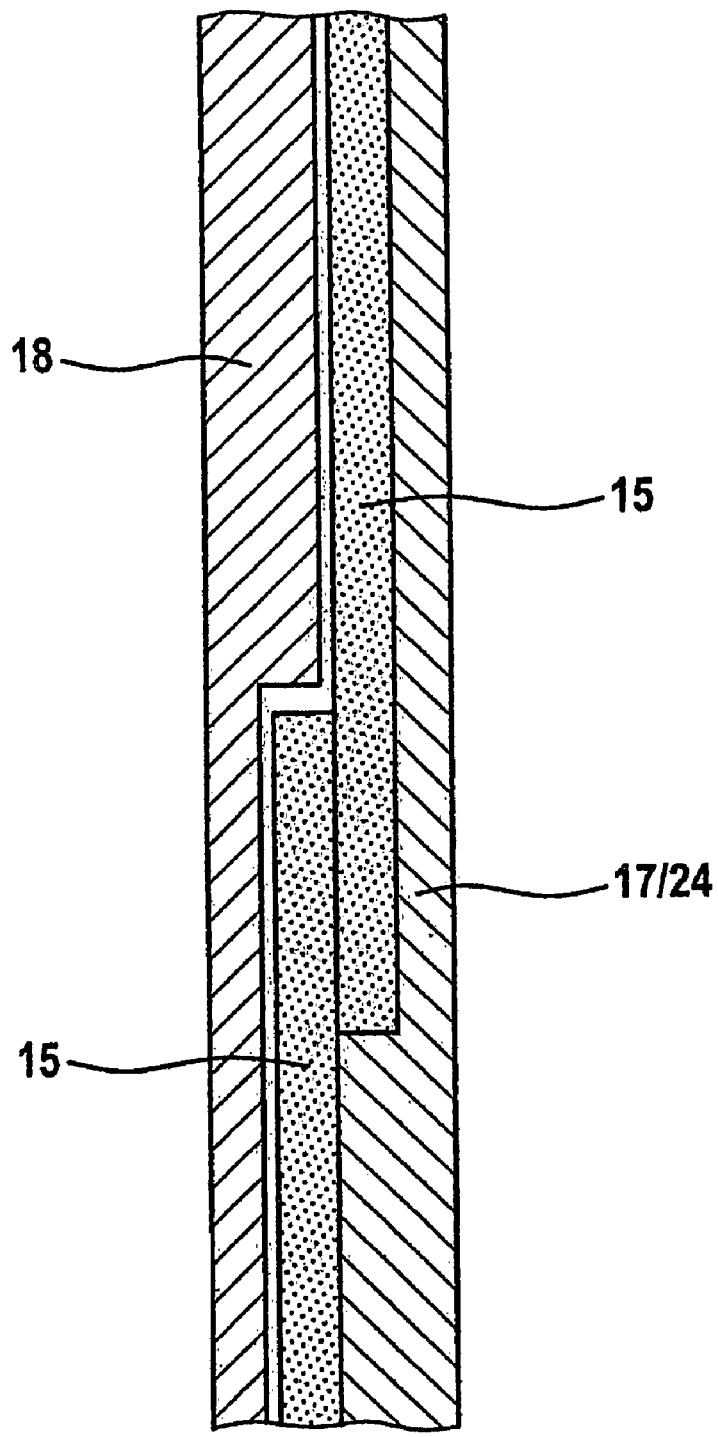
FIG. 3: a cross section through the sealing arrangement according to the present invention along the line of intersection III-III in accordance with FIG. 2.

From an axial viewpoint, FIG. 1 shows a schematic cross section through a rotor 10, as well as a stator 11 surrounding rotor 10, a gap 12 to be sealed being formed between rotor 10 and stator 11. To seal gap 12 between rotor 10 and stator 11, a brush seal is provided that is constituted of a brush-seal housing 13, a bristle carrier 14, and of a plurality of bristles 15 affixed to bristle carrier 14. FIG. 2 shows the arrangement of FIG. 1 viewed cross-sectionally along line of intersection II-II in FIG. 1, thus, as viewed circumferentially; FIG. 3 shows the arrangement of FIGS. 1 and 2 along the line of intersection III-III in FIG. 2, thus as viewed radially.

As may be inferred from FIG. 2, bristle carrier 14 is positioned at least in portions thereof in a receiving space 16, free ends of bristles 15 projecting out of receiving space 16 and standing upright on rotor 10 in order to seal gap 12. Receiving space 16 is defined by a supporting element 17, as well as by a cover element 18, supporting element 17 being disposed on the lower-pressure side of gap 12 to be sealed. Supporting element 17 is often referred to as a supporting ring, and cover element 18 often as a cover ring as well.

In the context of the present invention, bristle carrier 14 is designed as a discontinuous and, accordingly, as a helicoidal ring, free ends 19 and 20 of bristle carrier 14 circumferentially overlapping one another. Accordingly, bristle carrier 14 is designed as an open and elastic ring which is not fixed in receiving space 16, but rather is freely movable within certain limits.

Thus, bristle carrier 14 is movable circumferentially, in the illustrated exemplary embodiment, the circumferential mobility being limited by two antirotation devices 21 and 22. A first antirotation device 21 is associated with a first end 20 of bristle carrier 14, this first antirotation device 21 limiting or restricting the mobility of bristle carrier 14 in one primary direction of rotation 23 of rotor 10. A second antirotation device 22, which is associated with second, free end 19 of bristle carrier 14, limits the mobility of bristle carrier 14 oppositely to primary direction of rotation 23 of rotor 10. In addition to the circumferential mobility, a radial mobility is also provided. The radial mobility allows the inside diameter to automatically adapt to eccentricities of or variations in gap 12. In addition, an axial mobility is also provided to a certain degree. The radial mobility as well as axial mobility are limited by the geometric dimensions of receiving space 16, respectively by the contours of supporting element 17 and, accordingly, of cover element 18.

In the illustrated exemplary embodiment, bristle carrier 14 designed as a helicoidal ring forms both an axial helix, as well as a diametral helix. Axial helix is to be understood here as the circumferentially mutually overlapping ends 19 and 20 of bristle carrier 14 being axially offset from one another. Diametral helix is to be understood here as the circumferentially mutually overlapping ends 19 and 20 of bristle carrier 14 being radially offset from one another. The axial offset, as well as the radial offset of ends 19 and 20 of bristle carrier 14 are inferable from FIG. 2. In this context, in accordance with FIG. 2, ends 19 and 20 of bristle carrier 14 are mutually offset in such a way that a radially inside end 19 of bristle carrier 14 rests against bristles 15 which are affixed to radially outside end 20 of bristle carrier 14. Although in the context of the present invention, the axial offsetting of free ends 19 and 20 of bristle carrier 14 would suffice, the additional radial offsetting of the same is preferred, in order to improve the sealing action.

As already mentioned numerous times, bristle carrier 14 is designed as a helicoidal ring having circumferentially mutually overlapping, free ends 19 and 20, free ends 19 and 20 being mutually offset at least axially, preferably, however, radially as well. As a result, a helicoidal or helical contour of bristle carrier 14 is provided, to which bristles 15 affixed to bristle carrier 14 also conform. The contour of supporting element 17 and, accordingly, of a supporting lip 24 of the same is adapted to this helicoidal or helical contour of bristle carrier 14. Therefore, the contact surface formed by supporting element 17 and, respectively, by supporting lip 24 for bristles 15 of brush seal 13 conforms to the helicoidal or helical contour of the brush seal and, in this context, has a thread-type design.

As FIG. 1 shows, bristles 15 of brush seal 13 are preferably biased relative to the radial direction. However, the bristles may also extend in parallel to the radial direction without any such biasing thereof.

The brush seal according to the present invention may find general applicability wherever a radial gap is to be non-hermetically sealed between a rotor and a stator. It is especially preferred for the sealing arrangement according to the present invention to be used in fluid flow machines, in particular in gas turbines, such as aircraft engines, or also in steam turbines. Thus, the sealing arrangement according to the present invention makes it possible to realize a so-called inner air seal, as well as a so-called outer air seal for sealing a radial gap between the ends of fixed guide vanes and a rotor, and, respectively, a gap between the free ends of rotating rotor blades and a housing of a compressor, respectively, of a turbine of the gas turbine.

The seal need not necessarily be designed as a brush seal. Rather, in the context of the present invention, the sealing elements may be designed, for example, as strips, lamellae or segments. The strips or lamellae may be laser-cut elements. The segments may overlap one another circumferentially. Moreover, the strips, lamellae or segments may also make up an integral part of the sealing-element carrier.

The sealing arrangement according to the present invention ensures a minimal leakage of the gap to be sealed in all operating states, it adapting automatically to eccentricities of the gap to be sealed or to operationally inherent variations in the same. Accordingly, the sealing arrangement may be described as a self-adapting seal. Since the degree of permissible overlapping coverage of the rotor is significantly increased by the sealing arrangement according to the present invention over the related-art sealing arrangements, the range of application for brush seals is clearly broadened. In addition, the wear to the bristles is minimized. Since the inside diameter of the brush seal is automatically self-adapting, it is able to be manufactured to greater tolerances, thereby substantially reducing the manufacturing costs.

What is claimed is:

1. A sealing arrangement for non-hermetically sealing a gap between a rotor and a stator, comprising:

a seal including a plurality of sealing elements affixed to a sealing-element carrier, the sealing-element carrier being disposed at least in portions thereof in a receiving space defined by a supporting element and by a cover element;

the sealing-element carrier including a ring having one or more points of discontinuity, free ends of the sealing-element carrier circumferentially overlapping one another in a region of at least one point of discontinuity, contours of the supporting element and of the cover element being adapted to the contours of the sealing-element carrier and of the sealing elements; and an antirotation device being associated with at least one of the free ends of each part of the sealing-element carrier.

2. The sealing arrangement as recited in claim 1 wherein the seal is designed as a brush seal, the sealing elements including bristles, and the sealing-element carrier including a bristle carrier.

3. The sealing arrangement as recited in claim 2 wherein the bristle carrier is designed as an open and elastic ring which is movably supported in the receiving space.

4. The sealing arrangement as recited in claim 3 wherein the bristle carrier is movable circumferentially, the antirotation device limiting a circumferential mobility of the bristle carrier.

5. The sealing arrangement as recited in claim 2 wherein the antirotation device limits mobility in one primary direction of rotation of the rotor.

6. The sealing arrangement as recited in claim 5 further comprising a second antirotation device limiting the mobility oppositely to the primary direction of rotation of the rotor, and being associated with a second end of the free ends of the bristle carrier.

7. The sealing arrangement as recited in claim 2 wherein the circumferentially mutually overlapping free ends of the bristle carrier are designed as a helicoidal ring and are axially offset.

8. The sealing arrangement as recited in claim 2 wherein the circumferentially mutually overlapping free ends of the bristle carrier are designed as a helicoidal ring and are axially and radially offset.

9. The sealing arrangement as recited in claim 8 wherein the free ends are offset in such a way that a radially inside end rests against bristles affixed to a radially outside end.

10. The sealing arrangement as recited in claim 2 wherein a contour of the supporting element is adapted to a helicoidal contour of the bristle carrier, the bristle carrier being designed as a helicoidal ring, in such a way that the contour of the supporting element conforms in a thread-type form to the helicoidal contour of the bristle carrier.

11. The sealing arrangement as recited in claim 2 wherein the bristles are oriented in parallel to a radial direction and are biased relative to the radial direction.

12. The sealing arrangement as recited in claim 1 wherein the sealing elements are designed as strips, lamellae or segments.

13. The sealing arrangement as recited in claim 1 wherein the supporting element and the cover element are configured as contours on the stator.

14. A fluid flow machine comprising at least one sealing arrangement as recited in claim 1.

15. A gas turbine comprising at least one sealing arrangement as recited in claim 1.

16. An aircraft engine comprising the gas turbine of claim 15.

17. A steam turbine comprising at least one sealing arrangement as recited in claim 1.

* * * * *